United States Patent
Piche et al.

(10) Patent No.: US 7,602,784 B2
(45) Date of Patent: Oct. 13, 2009

(54) METHOD AND APPARATUS TO PERMIT DATA TRANSMISSION TO TRAVERSE FIREWALLS

(75) Inventors: Christopher Piche, West Vancouver (CA); Md. Shahbadatullah Khan, North Vancouver (CA); David Everett Marwood, North Vancouver (CA); Michael Chung, Gibsons (CA)

(73) Assignee: Eyeball Networks, Inc., West Vancouver (CA)

( * ) Notice: Subject to any disclaimer, the term of this patent is extended or adjusted under 35 U.S.C. 154(b) by 981 days.

(21) Appl. No.: 10/468,439

(22) PCT Filed: Feb. 19, 2002

(86) PCT No.: PCT/CA02/00214

§ 371 (c)(1),
(2), (4) Date: Aug. 19, 2003

(87) PCT Pub. No.: WO02/067531

PCT Pub. Date: Aug. 29, 2002

(65) Prior Publication Data

US 2004/0095937 A1    May 20, 2004

Related U.S. Application Data

(60) Provisional application No. 60/269,357, filed on Feb. 20, 2001.

(51) Int. Cl.
*H04L 12/28* (2006.01)
(52) U.S. Cl. .......................... 370/392; 370/401; 726/11

(58) Field of Classification Search .................. 370/389, 370/382, 395.2, 395.21, 400, 401; 726/11–15
See application file for complete search history.

(56) References Cited

U.S. PATENT DOCUMENTS

| 5,793,763 | A | | 8/1998 | Mayes et al. | |
|---|---|---|---|---|---|
| 6,055,236 | A | * | 4/2000 | Nessett et al. | 370/389 |
| 6,259,701 | B1 | * | 7/2001 | Shur et al. | 370/401 |
| 6,496,935 | B1 | * | 12/2002 | Fink et al. | 726/13 |
| 6,618,368 | B1 | * | 9/2003 | Tanigawa et al. | 370/352 |
| 2002/0032798 | A1 | * | 3/2002 | Xu | 709/238 |
| 2002/0114319 | A1 | * | 8/2002 | Liu et al. | 370/352 |
| 2004/0252683 | A1 | * | 12/2004 | Kennedy et al. | 370/389 |

OTHER PUBLICATIONS

Eschenburg A. "Wo Laufen Sie Denn? ICQ Haelt Verbindung Zu Bekannten", Ct Magazin Fuer Computer Technik, Verlag Heinz Heise GMBH., Hannover, Germany, No. 22, Oct. 26, 1998, pp. 92-95.

(Continued)

*Primary Examiner*—Jayanti K Patel
*Assistant Examiner*—Bo Hui A Zhu

(57) ABSTRACT

Currently data transmission over the Internet between two client computers where both client computers are protected by firewalls is problematic, since firewalls block incoming packets. A method is provided for permitting packet based data transmission between a first client computer C1 protected by a first NAPT or NAT firewall and a second client computer C2 protected by a second NAPT or NAT firewall to traverse the first and the second firewalls. The method can also be applied to other devices, such as routers, using NAT or NAPT.

35 Claims, 2 Drawing Sheets

OTHER PUBLICATIONS

Rosenberg J. et al. "Getting SIP through Firewalls and NATs", Internet Draft, Feb. 22, 2000.

Tsuchiya P. F. et al. "Extending the IP Internet through address reuse", Computer Communication Review, Association for Computing Machinery, New York, USA, vol. 1, No. 23, 1993, pp. 16-33.

Kegel, Dan; "NAT and Peer-to-peer Networking"; available on website http://alumnus.caltech.edu/dank/peer-nat.html.

Srisuresh, P. (Jasmine Networks); Egevang, K. (Intel Corporation); "Traditional IP Network Address Translator (Traditional NAT)"; on website http://tools.ietf.org/html/rfc3022.

Egevang, K. (Cray Communications); Francis P. (NTT); "The IP Network Address Translator (NAT)"; on website http://tools.ietf.org/html/rfc1631.

Holdrege, M. (ipVerse); Srisuresh, P. (Jasmine Networks); "Protocol Complications with the IP Network Address Translator"; on website http://tools.ietf.org/rfc/rfc3027.

Kegel, Dan (Linux IP NAT Forum); "NAT Support for Peer-to-Peer Games: a Proposal"; extract from Internet chat room: http://www.hasenstein.com/HyperNews/get/linux-ip-nat/97.htm.

O'Reilly & Associates; "Internet Core Protocols—the Definitive Guide"; ISBN: 1-56592-572-6, pp. 250-257.

Reitz, Andrew Joseph; "The Dynamic Port Reservation Protocol"; university thesis.

Schulzrinne, H. (GMD Fokus) et al; "RTP: a Transport Protocol for Real-Time Applications"; on website http://tools.ietf.org/html/rfc1889.

Kostas et al; "Real-Time Voice over Packet-Switched Networks".

* cited by examiner

METHOD AND APPARATUS TO PERMIT DATA TRANSMISSION TO TRAVERSE FIREWALLS

RELATED APPLICATION

This application claims priority from previously filed U.S. provisional patent application Ser. No. 60/269,357, filed Feb. 20, 2001, entitled METHOD AND APPARATUS TO PERMIT REAL-TIME MEDIA DELIVERY TO TRAVERSE FIREWALLS ON A COMPUTER NETWORK.

TECHNICAL FIELD

The invention relates to the field of data transmission over a computer network, and more particularly to methods for permitting data transmissions using packet based transmission protocols to traverse firewalls.

BACKGROUND ART

Computers connected to wide area networks like the Internet are commonly protected by firewalls. Firewalls are most commonly used to protect computers operating on local area networks, but they can also be used to protect individual computers, including servers, which access a wide area network. In this application, the term "client computer" will encompass any computer with access to a wide area network, and also a program operating on such a computer. Such a computer may, but need not, operate on a local area network, and may perform the functions of a server on the wide area network.

Firewalls typically perform a number of functions. They protect internal computers from outside computers on the wide area network, while allowing internal computers to access the wide area network. Firewalls can also make local network administration more efficient, by permitting a large number of client computers to share a limited pool of Internet Protocol (IP) addresses on the wide area network, and by accommodating changes within the local network without having to re-configure access to the other computers on the wide area network.

A firewall is typically a program or collection of related programs on a network gateway server which check each network packet to determine whether to forward it to its destination. To create a barrier between an internal computer and the outside wide area network, firewalls commonly use NAT (network address translation) or NAPT (network address and port translation). NAT is the translation of an internal IP address used by a client computer (and known within the internal network, if the client computer is operating on one), to a different IP address known within the outside wide area network. The firewall maps internal IP addresses to one or more global external IP addresses, and reverse maps the external IP addresses on incoming packets back into internal IP addresses. NAPT is the translation of both internal IP addresses and internal ports to different external IP addresses and external ports known within the outside network. Firewalls using NAPT commonly screen incoming packets to make sure that they come from a previously identified IP address and port. That is, a request from a particular IP address and port traverses the firewall only if a request previously went out from the firewall to that IP address and port.

Data transmission over the Internet has become an everyday occurrence. Many Internet data transmissions are used to transport audio and/or video data from a live or on-demand streaming server to streaming clients, to provide real-time interactive communication (such as "chat") between client computers, to transport the contents of web-pages from web-servers to web-clients, and for many other types of communication among networked programs. Different protocols are used to transmit different types of data. For example, text chat is generally transmitted using Transmission Control Protocol (TCP), while audio/video conferencing and live audio/video streaming are generally transmitted using UDP (User Datagram Protocol). Communications through a server connected directly to the Internet (that is, not behind a firewall) are not generally obstructed by client-side firewalls; the act of logging on to a server generally opens a return path from the server through the firewall. However, firewalls commonly block direct client-to-client, or "peer-to-peer" communication. One attempted solution is to open certain ports in the firewall, but this solution (i) requires modification of the firewall settings, which most network administrators are reluctant to do, and (ii) does not work with firewalls that perform any sort of port translation. The present invention provides a method for permitting packet based data transmission to traverse firewalls using either NAPT or NAT without altering firewall settings. The invention is disclosed in the context of a firewall using NAPT, as the more general case. However, the method provided in the invention is equally applicable to a firewall using NAT, and also to other types of devices, such as routers, using either NAPT or NAT.

DISCLOSURE OF INVENTION

The invention therefore provides a method of transmitting a data packet from a first computer to a second computer over a wide area computer network, a data packet transmitted from the first computer having a first source address designating the first computer and a data packet transmitted from the second computer having a second source address designating the second computer, wherein the first computer is protected by a first firewall which translates the first source address to a first external address when transmitting a data packet from the first computer to the wide area network, and the second computer is protected by a second firewall which translates the second source address to a second external address when transmitting a data packet from the second computer to the wide area network, the first and second firewalls communicating over the wide area computer network, the method using a designated recipient computer in communication with the first and second computers via the wide area computer network, said method comprising: a) the first and second computers sending first and second data packets to the designated recipient computer; b) the designated recipient computer communicating the first external address from the first data packet to the second computer and communicating the second external address from the second data packet to said first computer; c) the second computer sending a data packet to the first external address; and d) the first computer sending a data packet to said second external address.

The method further provides for two-way transmission of data by additionally having the second computer then send a data packet to the first external address. The method can be applied to a plurality of computers protected by firewalls communicating over a wide area network. The firewalls may be NAT or NAPT. In particular the method works if the IP address and port are translated at the firewall, or only the IP address. The designated recipient computer can be any type of computer, including without limitation a designated server, a peer computer involved in the data transmission, or a peer computer not involved in the data transmission.

The present invention further provides a computer program product for carrying out the foregoing method, and a system for transmitting a data packet between two firewall-protected computers over a wide area network.

BEST MODE(S) FOR CARRYING OUT THE INVENTION

Figure 1:
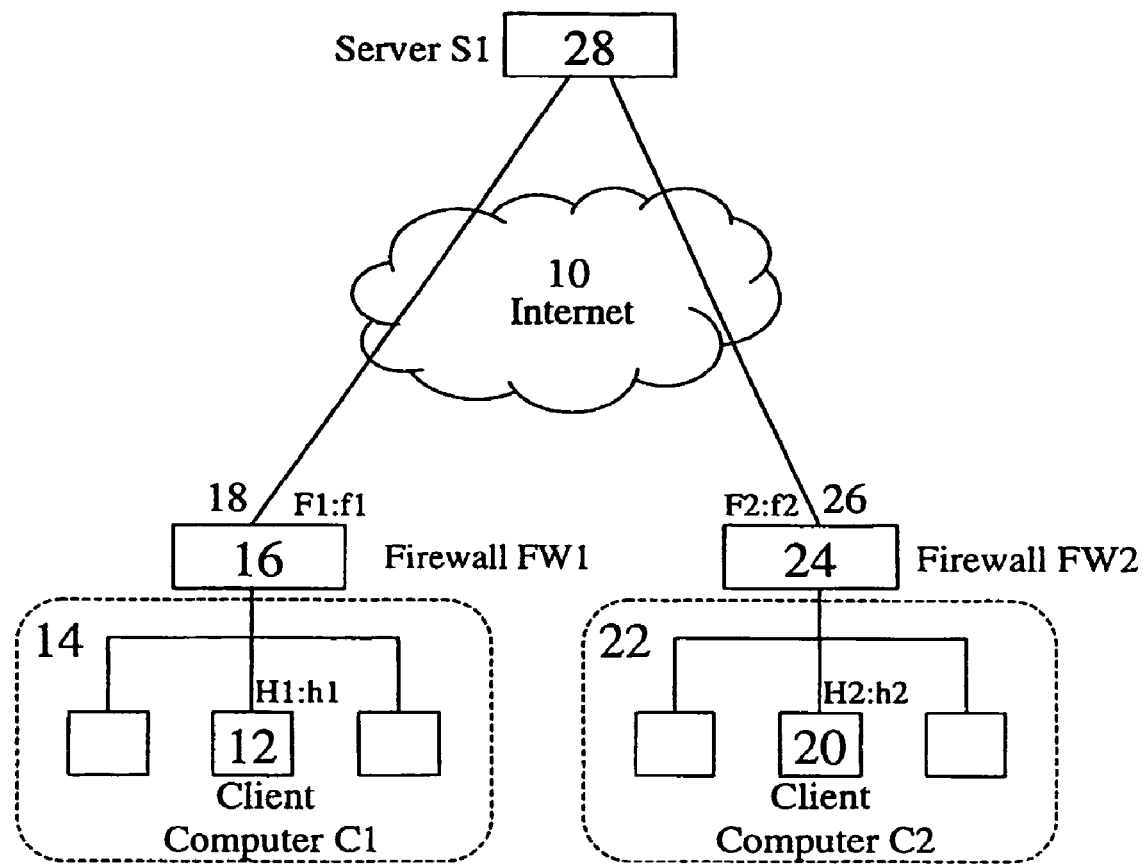
FIG. 1 is a schematic diagram illustrating a preferred embodiment of the invention.
Figure 2:
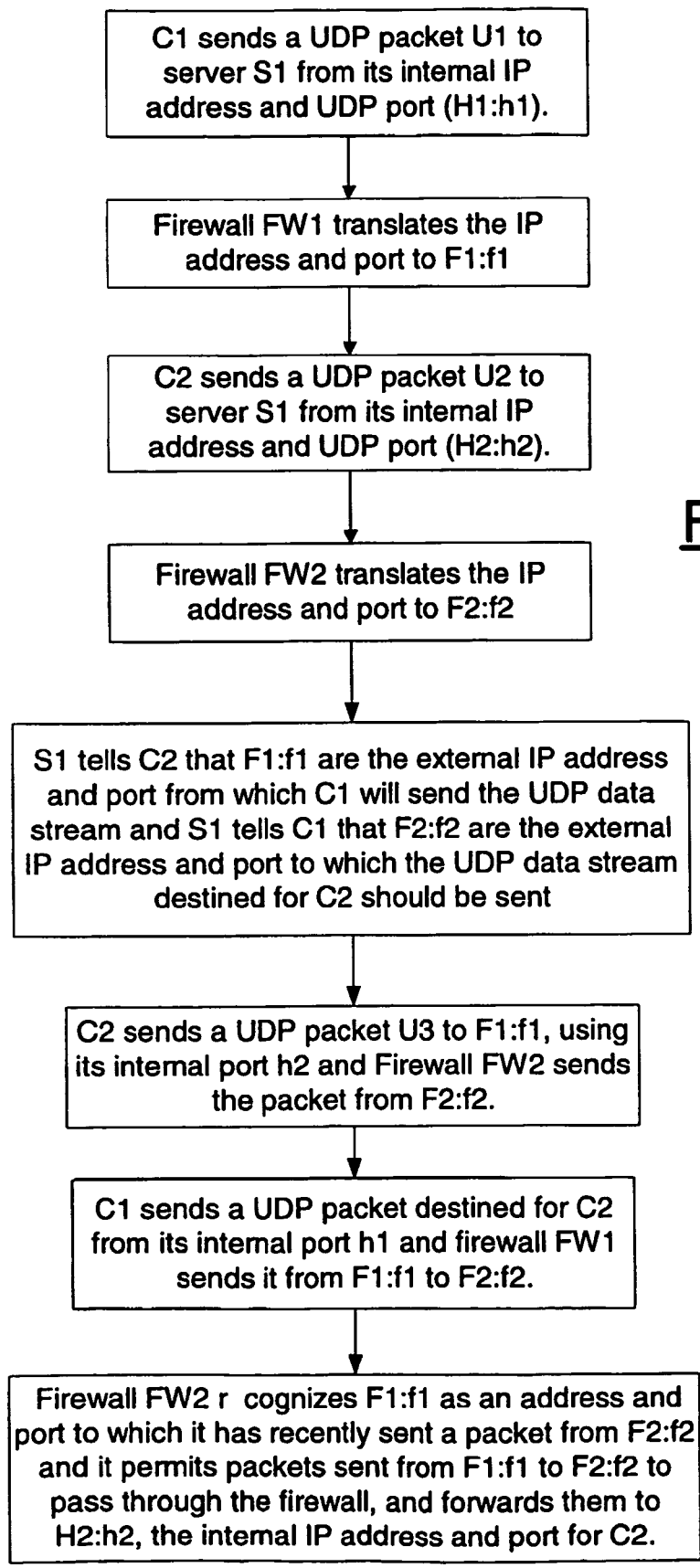
FIG. 2 is a flowchart illustrating a preferred embodiment of the invention.

FIG. 1 schematically illustrates a client computer C1 (12) on local area network (14), protected by NAPT firewall FW1 (16), wishing to send a UDP data stream, such as a live video data stream, over Internet 10, to client computer C2 30 (20) on local area network (22), protected by NAPT firewall FW2 (24). Within this schematic, C1 has internal IP address H1, and will use internal port h1 to transmit the UDP data stream. Firewall FW1 translates these into external IP address F1 and external port f1 (18). C2 has internal IP address H2, and will use internal port h2 to receive the UDP data stream. Firewall FW2 will receive UDP packets destined for C2 at external IP address F2 and external port f2 (26). Both C1 and C2 log onto a server S1 (28), whose purpose is to establish a path to transmit the UDP data stream from C1 to C2. However, the UDP data stream is not transmitted through the server. It is sent client-to-client to take advantage of efficiencies and scalability that can be realized from peer-to-peer communication over the Internet.

Peer-to-peer communications are prevented by almost all firewalls. NAPT firewalls FW1 and FW2 will only permit an incoming UDP packet to pass if (i) its source and destination addresses match the destination and source addresses, respectively, of a recent outgoing UDP packet, and (ii) its source and destination ports match the destination and source ports, respectively, of a recent outgoing UDP packet. If either C1 or C2 attempts to send a packet to the other, the receiver's firewall will block the incoming packet if it does not meet these criteria.

The present invention permits C1 to send a UDP data stream to C2 by the following steps:

(1) C1 sends a UDP packet U1 to server S1. C1 initiates the transmission from its internal IP address and UDP port (H1:h1). Firewall FW1 translates the IP address and port to F1:f1 at the external interface of FW1.

(2) When S1 receives packet U1 from F1:f1, S1 can identify F1 and f1 as the external IP address and external port from which FW1 will send the UDP data stream originating with C1.

(3) C2 sends a UDP packet U2 to server S1. C2 initiates the transmission from its internal IP address and UDP port (H2:h2). Firewall FW2 translates the IP address and port to F2:f2 at the external interface of FW2.

(4) When S1 receives packet U2 from F2:f2, S1 can identify F2 and f2 as the external IP address and external port at which FW2 will receive the UDP data stream to be transmitted from C1 to C2.

(5) S1 tells C2 that F1:f1 are the external IP address and port from which C1 will send the UDP data stream.

(6) S1 tells C1 that F2:f2 are the external IP address and port to which the UDP data stream destined for C2 should be sent.

(7) C2 sends a UDP packet U3 to F1:f1, using its internal port h2. Firewall FW2 will send the packet from F2:f2. This packet will be blocked by firewall FW1. However, as described in step (8), it will prompt firewall FW2 to pass subsequent packets sent by C1 destined for C2.

(8) When C1 subsequently sends a data stream consisting of UDP packets destined for C2 from its internal port h1, firewall FW1 will send them from F1:f1 to F2:f2. Because of the packet sent in step (7), firewall FW2 recognizes F1:f1 as an address and port to which it has recently sent a packet from F2:f2. Accordingly, it permits packets sent from F1:f1 to F2:f2 to pass through the firewall, and forwards them to H2:h2, the internal IP address and port for C2.

In this way, the invention creates a means by which UDP data streams originating with C1 pass through to C2. This can be used for streaming applications, in which C1 sends a live or on-demand data stream to C2. Steps similar to (1) to (8), carried out vice versa, will permit UDP data streams originating with C2 to pass through firewall F1, to C1. Thus, C1 and C2 can utilize applications which depend on two-way transmission of UDP data streams, such as video conferencing. Similar steps carried out by a number of client computers, C1, . . . , CN, will permit one-to-many, many-to-one, or many-to-many transmission of UDP data streams through NAPT firewalls.

For the method to work with a firewall using NAPT, the packets sent in steps (1) and (3) will generally have to be of the same type (i.e. TCP, UDP, etc.) as the type used to transmit the data in step (8). The reason is that many computer applications or firewalls use different ports to transmit and receive different types of data. However, if that is not the case, the packets sent in steps (1) and (3) need not be of the same type as the type used in step (8). In addition, firewall FW1 must use the same external IP address and port to send the initial packet in step (1) as it uses subsequently to commence sending the data to C2 in step (8) (although the method can be adapted to accommodate subsequent changes in the IP addresses and ports, as described more fully below). This generally happens in practice so long as the software at client computer C1 is written to send both transmissions from the same internal IP address and port, as most firewall programs using NAPT currently create one-to-one mappings between internal IP addresses and ports and external IP addresses and ports used to send the same type of packet. Similarly, firewall FW2 must use the same external IP address and port to send the packet in step (3) that it will use to commence receiving the data in step (8). This also will generally happen in practice, so long as the software at client computer C2 is written to send the packet in step (3) from, and to receive the data in step (8) at, the same internal IP address and port.

As will be apparent to those skilled in the art, the method can be readily adapted to support two-way data transmission between C1 and C2, to support one-to-many data transmission from C1 to client computers C2, . . . , CN, to support many-to-one data transmission from client computers C2, . . . , CN to C1, or to support many-to-many data transmission among client computers C1, . . . , CN. As well, the invention has been described with both C1 and C2 protected by firewalls, as that situation provides the clearest description of the invention. However, the method is readily adapted to the situation where only the receiving client computer is protected by a firewall.

The designated recipient computer can be any type of computer, including without limitation a designated server, a peer computer involved in the data transmission, or a peer computer not involved in the data transmission.

As will be apparent to those skilled in the art in light of the foregoing disclosure, many alterations and modifications are possible in the practice of this invention without departing from the spirit or scope thereof. For example, the possible alterations and modifications include, but are not limited to, the following:

1. For robustness against packet loss or delay, C1 and/or C2 could send multiple packets to S1 in steps (1) and (3), instead of a single packet. Packets could be sent until confirmation is received that S1 has received one of the packets.
2. Also for robustness against packet loss or delay, C2 could send multiple packets in step (7), instead of a single packet. Packets could be sent until confirmation is received that FW1 has received one of the packets.
3. The method can also be used when either C1 or C2 uses separate ports for sending and receiving UDP data streams. For example, if C1 uses h1 for sending UDP data streams and h3 for receiving data streams, firewall FW1 will translate these into f1 and f3 respectively. C2 would have to send a UDP packet from its receiving port to f1, and C1 would have to send a UDP packet from f3 to the sending port for C2. These packets would open paths over which C1 could send to C2 (through f1), and over which C2 could send to C1 (through f3).
4. In the case of two-way communication, and where firewalls FW1 and FW2 use the same external ports for both sending and receiving UDP data, the initial data packets in the data streams can be used as the packets required to open the paths (as in step (7)). The initial data packets may be blocked, until a data packet is sent in the other direction. However, applications using UDP transmissions are typically robust against packet loss, and the method will work so long as loss of the initial data packet or packets is not critical to the application in question.
5. If firewall FW1 (or FW2) changes the external IP address or port which it uses to transmit UDP data for any reason (such as a long data transmission or period of silence), the method can be adapted to refresh the data identifying the external IP addresses and ports, to maintain open transmission paths. For example, if FW1 changes the external IP address or port used to transmit UDP data originating from C1, new packets will be sent periodically to the intermediary server S1 as in step (1), above, to identify any new IP address or port being used by FW1. The remaining steps (2) through (8) can then be repeated using new data. All that the method requires is that the same external sending IP address and port be used by FW1 for a long enough period of time that the initial packet sent to S1 in step (1) come from the same IP address and port as the initial data packets in the UDP data stream.
6. In the best mode described above, server S1 is used as intermediary to receive UDP packets originating from C1 and C2, and to use information contained in those packets to identify the external ports being used by FW1 and FW2. However, any other means for informing each terminal of the other's external ports will also work according to the invention. For example, C1 and C2 could use different echo servers, S1 and S2, which return any UDP packet to its source. This will permit C1 and C2 to identify F1:f1 and F2:f2, respectively. C1 and C2 could use any other means, such as off-line exchange of information by the users, or TCP transmissions either directly to the other or through a common server, to inform each other about F1:f1 and F2:f2.
7. The method can be used where client computers communicate through a server computer, although the method is not usually needed in that case, as a client computer generally opens a return path from the server when it logs on to the server.
8. The method can also be used where only the receiving client computer is behind a firewall, but there is no firewall protecting the sending client computer.
9. Although the above method has been described in the context of real-time audio and video communications using UDP packets, it will be apparent to those skilled in the art that the method has application to other forms of packet based data transmission.
10. The method can also be adapted to firewalls which do not create one-to-one mappings between internal and external IP addresses and ports, by deducing the mapping scheme from received packets, and then utilizing the deduced mapping schemes to send the required packets from the external receiving IP addresses and ports of each client computer to the external sending IP addresses and ports of each other client computer.
11. While the invention has been disclosed in connection with a NAPT firewall, it would also operate in the same manner if firewalls FW1 and FW2 are NAT firewalls. In that case, NAT FW1 would translate H1:h1 to F1:h1, and NAT FW2 would translate H2:h2 to F2:h2. The method would otherwise be identical.

What is claimed is:

1. A method of transmitting a UDP data packet from a first computer to a second computer over a wide area computer network, said first computer having a first internal network address and a designated internal port from which it will transmit the UDP data packet and said second computer having a second internal network address and a designated internal port at which it will receive the UDP data packet, wherein said first computer is protected by a first firewall which translates said first internal network address to a first external network address when communicating over said wide area computer network, and said second computer is protected by a second firewall which translates said second internal network address to a second external network address when communicating over said wide area computer network, said first and second firewalls communicating over said wide area computer network, said method using a designated recipient computer in communication with said first and second computers via said wide area computer network, said method comprising:

(a) said first computer sending a first UDP data packet to said designated recipient computer using its designated internal transmitting port, and said second computer sending a second UDP data packet to said designated recipient computer using its designated internal receiving port;

(b) said designated recipient computer communicating said first external network address and said designated internal transmitting port determined from said first UDP data packet to said second computer, and communicating said second external network address and said designated internal receiving port determined from said second UDP data packet to said first computer;

(c) said second computer sending a UDP data packet using its designated internal receiving port to said first external network address and the designated internal transmitting port of said first computer;

(d) said first computer sending a UDP data packet using its designated internal transmitting port to said second external network address and the designated internal receiving port of said second computer;

wherein said second computer sends said UDP data packet to said first computer prior to said first computer sending said UDP data packet to said second computer.

2. The method of claim 1 wherein each of said firewalls protecting each of said computers further translates said designated internal transmitting and receiving ports of each of said computers to external transmitting and receiving ports, and:
   (a) in step (b) of claim 1, said designated recipient computer communicates said first external network address and external transmitting port determined from said first UDP data packet to said second computer and communicates said second external network address and external receiving port determined from said second UDP data packet to said first computer;
   (b) in step (c) of claim 1, the UDP data packet sent from said second computer is sent using the designated internal receiving port of said second computer to said first external network address and external transmitting port of said first computer; and
   (c) in step (d) of claim 1, the UDP data packet sent from said first computer is sent using the designated internal transmitting port of said first computer to said second external network address and external receiving port of said second computer.

3. A method for permitting two-way transmission of UDP data packets between a first computer and a second computer over a wide area computer network, each of said first and second computers having an internal network address, a designated internal port from which it will transmit the UDP data packets, and a designated internal port at which it will receive the UDP data packets, wherein said first computer is protected by a first firewall which translates said internal network address of said first computer to a first external network address when communicating over said wide area computer network, and said second computer is protected by a second firewall which translates said second internal network address to a second external network address when communicating over said wide area computer network, said first and second firewalls communicating over said wide area computer network, said method using a designated recipient computer in communication with said first and second computers via said wide area computer network, said method comprising:
   (a) said first computer sending two UDP data packets to said designated recipient computer, one sent using the designated internal transmitting port of said first computer and one sent using the designated internal receiving port of said first computer, and said second computer sending two UDP data packets to said designated recipient computer, one sent using the designated internal transmitting port of said second computer and one sent using the designated internal receiving port of said second computer;
   (b) said designated recipient computer communicating said first external network address, designated internal transmitting port, and designated internal receiving port of said first computer, determined from said data packets sent from said first computer, to said second computer, and communicating said second external network address, designated internal transmitting port, and designated internal receiving port of said second computer, determined from said data packets sent from said second computer, to said first computer;
   (c) said second computer sending a UDP data packet using its designated internal receiving port to said first external network address and designated internal transmitting port of said first computer, and said first computer sending a UDP packet using its designated internal receiving port to said second external network address and designated internal transmitting port of said second computer, said second computer sending said UDP data packet to said first computer prior to said first computer sending said UDP data packet to said second computer;
   (d) said first computer sending UDP data packets using its designated internal transmitting port to said second external network address and designated internal receiving port of said second computer, and said second computer sending UDP data packets using its designated internal transmitting port to said first network address and designated internal receiving port of said first computer.

4. The method of claim 3 wherein each of said firewalls protecting each of said computers further translates said designated internal transmitting and receiving ports of each of said computers to external transmitting and receiving ports, and:
   (a) in step (b) of claim 3 said designated recipient computer communicates said first external network address, external transmitting port, and external receiving port of said first computer, determined from said data packets sent from said first computer, to said second computer, and communicates said second external network address, external transmitting port, and external receiving port of said second computer, determined from said data packets sent from said second computer, to said first computer;
   (b) in step (c) of claim 3, the TJDP data packet sent from said second computer is sent using the designated internal receiving port of said second computer to said first external network address and external transmitting port of said first computer, and the UDP data packet sent from said first computer in sent using the designated internal receiving port of said first computer to said second external network address and external transmitting port of said second computer; and
   (c) in step (d) of claim 3, the UDP data packets sent from said first computer are sent using the designated internal transmitting port of said first computer to said second external network address and external receiving port of said second computer, and the UDP packets sent from said second computer are sent using the designated internal transmitting port of said second computer to said first external network address and external receiving port of said first computer.

5. A method for permitting two-way transmission of UDP data packets between any two of a plurality of computers over a wide area computer network, each computer having an internal network address, a designated internal port from which it will transmit the UDP data packets, and a designated internal port at which it will receive the UDP data packets, wherein each computer is protected by a firewall which translates said internal network address of said computer to an external network address when communicating over said wide area computer network, said firewalls communicating over said wide area computer network, said method using a designated recipient computer in communication with said plurality of computers via said wide area computer network, said method comprising:
   (a) said plurality of computers sending respective UDP data packets to said designated recipient computer using their designated internal receiving ports, and sending respective UDP data packets to said designated recipient computer using their designated internal transmitting ports;

(b) said designated recipient computer communicating the respective external network addresses, designated internal transmitting ports, and designated internal receiving ports determined from said data packets to said plurality of computers;

(c) a first of said plurality of computers having a first external network address sending a first UDP data packet using its designated internal receiving port to a second external network address and designated internal transmitting port associated with a second of said plurality of computers, and said second of said plurality of computers sending a UDP data packet using its designated internal receiving port to said first external network address and designated internal transmitting port associated with said first of said plurality of computers; said first of said plurality of computers sending said first UDP data packet to said second of said plurality of computers prior to said second of said plurality of computers sending said UDP data packet to said first of said plurality of computers; and (d) said second computer sending UDP data packets using its designated internal transmitting port to said first external network address and designated internal receiving port associated with said first computer, and said first computer sending UDP data packets using its designated internal transmitting report to said second external network address and internal receiving port associated with said second computer.

6. The method of claim 5 wherein each of said firewalls protecting each of said computers further translates said designated internal transmitting and receiving ports of each of said computers to external transmitting and receiving ports, and:

(a) in step (b) of claim 5, said designated recipient computer communicates the respective external network addresses, external transmitting ports, and external receiving ports determined from said data packets to said plurality of computers;

(b) in step (c) of claim 5, said first of said plurality of computers sends a first UDP packet using its designated internal receiving port to said second external network address and external transmitting port associated with said second of said plurality of computers, and said second of said plurality of computers sends a UDP data packet using its designated internal receiving port to said first external network address and external transmitting port associated with said first of said plurality of computers; and (c) in step (d) of claim 5, said second computer sends UDP data packets using its designated internal transmitting port to said first external network address and external receiving port associated with said first computer, and said first computer sends UDP data packets using its designated internal transmitting report to said second external network address and external receiving port associated with said second computer.

7. The method of claims 1, 3 or 5 wherein said firewalls are NAT firewalls.

8. The method of claims 1, 3 or 5 wherein said data packets consist of live audio/video data streams.

9. The method of claims 1, 3 or 5 wherein said data packets consist of stored audio/video data.

10. The method of claims 1, 3 or 5 wherein said data packets consist of the contents of a stored computer file.

11. The method of claims 1, 3 or 5 wherein said data packets consist of data streams carrying audio/video conferencing communication 12. The method of claims 1, 3 or 5 wherein multiple data packets are sent by each of said sending computers in step (a) of claims 1, 3 or 5.

13. The method of claims 1, 3 or 5 wherein multiple data packets are sent by each of said sending computers in step (c).

14. The method of claims 1, 3 or 5 wherein multiple data packets are sent by each of said sending computers in step (d).

15. The method of claims 1, 3 or 5 wherein each of said computers uses the same internal pods for sending and receiving said data packets, and:

(a) the UDP data packets sent by each sending computer are sent using the common internal transmitting and receiving port of said computer; and (b) the UDP data packets sent to each receiving computer are sent to the common internal transmitting and receiving port of said computer.

16. The method of claims 1, 3 or 5 wherein the steps therein are repeated periodically to accommodate changes in said designated internal transmitting ports and said designated internal receiving ports being used by some or all of the firewalls.

17. The method of claims 1, 3 or 5 wherein said designated recipient computer is a common server.

18. The method of claims 1, 3 or 5 wherein said designated recipient computer is a peer computer involved in the data transmission.

19. The method of claims 1, 3 or 5, wherein said designated recipient computer is a peer computer not involved in the data transmission.

20. The method of claims 1, 3 or 5 wherein:

(a) said designated recipient computer is an echo server, and said echo server communicates said addresses and ports from each of said UDP data packets transmitted to said designated recipient computer to the computer which was the source of said UDP data packet; and (b) said source computers communicate their respective addresses and ports to the other computers over said wide area computer network.

21. The method of claims 1, 3 or 5 wherein said computers communicate through a wide area network by transmitting data through a server computer.

22. The method of claim 2, 4 or 6 wherein said firewalls are NAPT firewalls.

23. The method of claim 2, 4 or 6 wherein each of said computers uses the same internal ports for transmitting and receiving said data packets, which internal ports get translated by said firewalls into the same external ports for sending and receiving said data packets, and:

(a) the UDP data packets sent by each sending computer are sent using the common internal transmitting and receiving port of said computer; and (b) the UDP data packets sent to each receiving computer are sent to the common external transmitting and receiving port of said computer.

24. A computer readable medium containing computer executable code for transmitting a UDP data packet from a first computer to a second computer over a wide area computer network, said computer executable code designating an internal port from which said first computer will transmit the UDP data packet and designating an internal port at which said second computer will receive the UDP data packet, said first computer having a first internal network address and said second computer having a second internal network address, wherein said first computer is protected by a first firewall which translates said first internal network address to a first external network address when communicating over said wide area computer network, and said second computer is protected by a second firewall which translates said second internal network address to a second external network address when communicating over said wide area computer network, said first and second firewalls communicating over said wide area computer network, said method using a designated recipient computer in communication with said first and second computers via said wide area computer network, said computer executable code comprising:

(a) program code for causing said first computer to send a first UDP data packet to said designated recipient computer using its designated internal transmitting port, and causing said second computer to send a second UDP data packet to said designated recipient computer using its designated internal receiving port;

(b) program code for causing said designated recipient computer to communicate said first external network address and said designated internal transmitting port determined from said first UDP data packet to said second computer, and to communicate said second external network address and said designated internal receiving port determined from said second UDP data packet to said first computer;

(c) program code for causing said second computer to send a UDP data packet using its designated internal receiving port to said first external network address and designated internal transmitting port of said first computer; and (d) program code for causing said first computer to send a UDP data packet using its internal transmitting port to said second external network address and designated internal receiving port of said second computer;

wherein said second computer sends said UDP data packet to said first computer prior to said first computer sending said UDP data packet to said second computer.

25. The computer readable medium containing computer executable code of claim 24 wherein each of said computers is protected by a firewall which further translates said designated internal transmitting and receiving ports of each of said computers to designated external transmitting and receiving ports, and:

(a) in step (b) of claim 24, said designated recipient computer communicates said first external network address and external transmitting port determined from said first UDP data packet to said second computer and communicates said second external network address and external receiving port determined from said second UDP data packet to said first computer;

(b) in step (c) of claim 24, the UDP data packet sent from said second computer is sent using the designated internal receiving port of said second computer to said first external network address and external transmitting port of said first computer; and (c) in step (d) of claim 24, the UDP data packet sent from said first computer is sent using the designated internal transmitting port of said first computer to said second external network address and external receiving port of said second computer.

26. A computer readable medium containing computer executable code for permitting two-way transmission of data packets between a first computer and a second computer over a wide area computer network, said computer executable code designating for each said computer an internal port from which said computer will transmit the UDP data packets and designating for each said computer an internal port at which said computer will receive the UDP data packets, each of said computers having an internal network address, wherein said first computer is protected by a first firewall which translates said first internal network address to a first external network address when communicating over said wide area computer network, and said second computer is protected by a second firewall which translates said second internal network address to a second external network address when communicating over said wide area computer network, said first and second firewalls communicating over said wide area computer network, said method using a designated recipient computer in communication with said first and second computers via said wide area computer network, said program including:

(a) program code for causing said first computer to send two UDP data packets to said designated recipient computer, one sent using the designated internal transmitting port of said first computer and one sent using the designated internal receiving port of said first computer, and causing said second computer to send two UDP data packets to said designated recipient computer, one sent using the designated internal transmitting port of said second computer and one sent using the designated internal receiving port of said second computer;

(b) program code for causing said designated recipient computer to communicate said first external network address, designated internal transmitting port, and designated internal receiving port of said first computer, determined from said data packets sent from said first computer, to said second computer, and to communicate said second external network address, designated internal transmitting port, and designated internal receiving port of said second computer, determined from said data packets sent from said second computer, to said first computer;

(c) program code for causing said second computer to send a UDP data packet using its designated internal receiving port to said first external network address and designated internal transmitting port of said first computer, and causing said first computer to send a UDP packet using its designated internal receiving port to said second external network address and designated internal transmitting port of said second computer; and (d) program code for causing said first computer to send UDP data packets using its designated internal transmitting port to said second external network address and designated receiving port of said second computer, and causing said second computer to send UDP data packets using its designated internal transmitting port to said first external network address and designated internal receiving port of said first computer;

wherein said second computer and said first computer send said UDP packets using their designated internal receiving ports prior to said first computer and said second computer sending said UDP packets using their designated internal transmitting ports.

27. The computer readable medium containing computer executable code of claim 26 wherein each of said computers is protected by a firewall which further translates said designated internal transmitting and receiving ports of each of said computers to designated external transmitting and receiving ports, and:

(a) in step (b) of claim 26 said designated recipient computer communicates said first external network address, external transmitting port, and external receiving port of said first computer, determined from said data packets sent from said first computer, to said second computer, and communicates said second external network address, external transmitting port, and external receiving port of said second computer, determined from said data packets sent from said second computer, to said first computer;

(b) in step (c) of claim 26, the UDP data packet sent from said second computer is sent using the designated internal receiving port of said second computer to said first external network address and external transmitting port of said first computer, and the UDP data packet sent from said first computer is sent using the designated internal receiving port of said first computer to the second external network address and external transmitting port of said second computer; and (c) and in step (d) of claim 26, the UDP data packets sent from said first computer are sent using the designated internal transmitting port of said first computer to said second external network address and external receiving port of said second computer, and the UDP packets sent from said second computer are sent using the designated internal transmitting port of said second computer to said first external network address and external receiving port of said first computer.

28. A computer readable medium containing computer executable code for permitting two-way transmission of UDP data packets between any two of a plurality of computers over a wide area computer network, said computer executable code designating for each computer of said plurality of computers an internal port from which it will transmit the UDP data packets and an internal port at which it will receive the UDP data packets, each computer having an internal network address, wherein each computer is protected by a firewall which translates said internal address of said computer to an external network address when communicating over said wide area computer network, said firewalls communicating over said wide area computer network, said method using a designated recipient computer in communication with said plurality of computers via said wide area computer network, said program including:

(a) program code for causing each computer of said plurality of computers to send respective UDP data packets to said designated recipient computer using their designated internal receiving ports, and to send respective UDP data packets to said designated recipient computer using their designated internal transmitting ports;

(b) program code for causing said designated recipient computer to communicate the respective external network addresses, designated internal transmitting ports, and designated internal receiving ports determined from said data packets to said plurality of computers;

(c) program code for causing a first of said plurality of computers having a first external network address to send a first UDP data packet using its designated internal receiving port to a second external network address and designated internal transmitting port associated with a second of said plurality of computers, and causing said second of said plurality of computers to send a UDP data packet using its designated internal receiving port to said first external network address and designated internal transmitting port associated with said first of said plurality of computers; and (d) program code for causing said second computer to send UDP data packets using its designated internal transmitting port to said first external network address and designated internal receiving port associated with said first computer, and causing said first computer to send UDP data packets using its designated internal transmitting report to said second external network address and internal receiving port associated with said second computer;

wherein said first of said plurality of computers and said second of said plurality of computer send said UDP packets using their designated internal receiving ports prior to said second computer and said first computer sending said UDP packets using their designated internal transmitting ports.

29. The computer readable medium containing computer executable code of claim 28 wherein each of said computers is protected by a firewall which further translates said designated internal transmitting and receiving ports of each of said computers to designated external transmitting and receiving ports, and:

(a) in step (b) of claim 28, said designated recipient computer communicates the respective external network addresses, external transmitting ports, and external receiving ports determined from said data packets to said plurality of computers;

(b) in step (c) of claim 28, said first of said plurality of computers sends a first UDP packet using its designated internal receiving port to said second external network address and external transmitting port associated with said second of said plurality of computers, and said second of said plurality of computers sends a UDP data packet using its designated internal receiving port to said first external network address and external transmitting port associated with said first of said plurality of computers; and (c) in step (d) of claim 28, said second computer sends UDP data packets using its designated internal transmitting port to said first external network address and external receiving port associated with said first computer, and said first computer sends UDP data packets using its designated internal transmitting report to said second external network address and external receiving port associated with said second computer.

30. The computer readable medium containing computer executable code of claims 24, 26 or 28 wherein said real-time media delivery involves live audio/video data.

31. The computer readable medium containing computer executable code of claims 24, 26 or 28 wherein said real-Pine media delivery involves stored on-demand streamed audio/video data.

32. The computer readable medium containing computer executable code of claims 24, 26 or 28 wherein said real-time media delivery involves the contents of a stored computer file.

33. The computer readable medium containing computer executable code of claims 24, 26 or 28 wherein said real-time media delivery involves audio/video conferencing communication.

34. The computer readable medium containing computer executable code of claims 24, 26 or 28 wherein said computer executable code is operating to send a UDP data packet to an intermediary for the purpose of identifying said designated internal transmitting port which will be assigned to it, and receives data from the intermediary to identify said designated internal receiving port assigned to the other participant.

35. A system for transmitting a UDP data packet between two firewall-protected computers over a wide area network, said system comprising:

(a) first and second computers adapted to communicate over a wide area computer network, wherein said first computer has a first internal network address and a designated internal port for transmitting said UDP data packet and said second computer has a second internal network address and a designated internal port for receiving said UDP data packet, wherein said first computer is protected by a first firewall which translates said first internal network address and designated internal transmitting port to a first external network address and external transmitting port when communicating over said wide area network, and said second computer is protected by a second firewall which translates said second internal network address and designated internal receiving port to a second external network address and external receiving port when communicating over said wide area network, said first and second firewalls communicating over said wide area computer network;

(b) a designated recipient computer in communication with said first and second computers via said wide area computer network;

wherein said first and second computers comprise means for sending first and second UDP data packets to said designated recipient computer; said first computer sends said first UDP data packet using its designated internal transmitting port and said second computer sends said second UDP data packet using its designated internal receiving port; said designated recipient computer comprises means for communicating said first external network address and external transmitting port determined from said first UDP data packet to said second computer and communicating said second external network address and external receiving port determined from said second UDP data packet to said first computer; said second computer comprises means for sending a UDP data packet using its internal receiving port to said first external network address and the external transmitting port of said first computer; and said first computer comprising means for sending a UDP data packet using its internal transmitting report to said second external network address and the external receiving port of said second computer, said UDP data packet being sent from said second computer to said first computer prior to said UDP packet being sent from said first computer to said second computer.

* * * * *